United States Patent Office 2,902,503
Patented Sept. 1, 1959

2,902,503

RECOVERY OF URANIUM BY SECONDARY XANTHATE COMPLEXING

Orear Kenton Neville, Oak Ridge, Tenn., assignor to the United States of America as represented by the United States Atomic Energy Commission No Drawing. Application April 6, 1950
Serial No. 154,449

13 Claims. (Cl. 260—429.1)

The present invention relates in general to a uranium recovery process, and more particularly to a process for the separation and selective recovery of uranium values, especially when present in trace concentrations, from aqueous solutions containing the same, and from dissolved materials, such as bulk thorium and protactinium, associated therewith, by means of selectively complexing uranium with certain organic reagents and selectively recovering the resulting complexed uranium by organic solvent extraction.

It is to be understood that the terms uranium and thorium are used herein to designate those elements generically, whether in their elemental state or combined in compounds, or whether in natural isotopic proportion, or solely a particular isotopic species, unless otherwise indicated by the context.

As is known, there are various important operations in the art which require the selective recovery of uranium values from admixture with thorium values. Among these, the generally more difficult are those wherein small, even as little as trace, amounts of uranium must be separated from much larger masses of thorium. Such difficult separation is necessary, for example, in procedures for the derivation from thorium of certain valuable uranium isotopes, in particular $_{92}U^{233}$, $_{92}U^{232}$, and $_{92}U^{234}$. These isotopes are each conventionally generated in substantial isotopic purity by subject thorium, in either metallic or salt form, to a different particular nuclear transmutation reaction. In each case, it is generally feasible to transmute only a very minor portion of the thorium reactant, and thereafter separately recover and isolate the small amount of uranium isotope from the remaining mass of thorium.

Considering each of these isotopes in more detail, the $U^{233}$ isotope, being fissionable, is especially valuable as a neutronic reactor fuel. It is produced by irradiation of natural thorium (about 100% $Th^{232}$) with slow neutrons, preferably those generated in a nuclear fission reactor, according to the known, conventionally-represented reaction scheme:

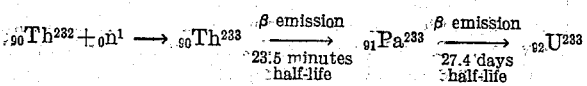

Since the product, $U^{233}$, is decomposed by fission induced by slow neutron irradiation, the irradiation is customarily terminated considerably prior to the time when the rate of $U^{233}$ destruction becomes equal to the rate of thorium transmutation. In practice, for this reason, the irradiation is generally terminated before an atomic ratio of $U^{233}+Pa^{233}$ to $Th^{232}$ of as high as $1:10^3$ obtains, and is usually stopped at a ratio of about $1:10^5$. After permitting the necessary protactinium decay for a suitable period, the small amount of produced uranium is then separated and recovered from the bulk of the unreacted thorium.

The $U^{232}$ isotope, being a moderately long-lived alpha radiation emitter, is valuable as a radioactive tracer. It may be produced by bombarding $Th^{232}$ with deuterons, preferably from a charged particle accelerator, such as a cyclotron or a linear accelerator energized by a Van de Graaff generator, according to the known reaction scheme:

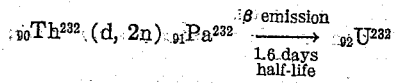

Because of the limited deuteron current producible by conventional accelerators, only a very minor amount of thorium is transmuted upon a bombardment of reasonable duration. After bombardment, the thorium target is detained for a short period to permit the necessary Pa decay, and the resulting uranium is separated from the bulk of the unreacted thorium.

The $U^{234}$ isotope is a longer-lived alpha emitter, and is also a valuable radioactive tracer. It occurs as an ultimate decay product of $_{92}U^{238}$ in accordance with the following scheme:

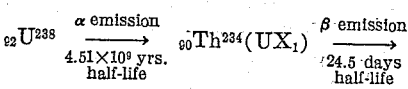

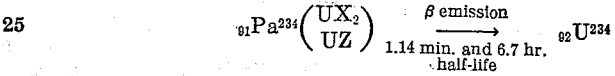

In the production of the $U^{234}$ isotope, the small content of $_{90}Th^{234}$ found associated with natural uranium, as a result of this decay over the ages, is isolated, ordinarily by a procedure which involves the addition of relatively large amounts of inactive thorium ($Th^{232}$) as a carrier in the concentration of $Th^{234}$ from solution. Later, after a suitable $Th^{234}$ decay period, the microscopic concentration of ensuant $U^{234}$ decay product is separately recovered from the bulk of the associated thorium.

Thus, all three of these exemplary processes, in common, require the separation recovery of small amounts of uranium from large amounts of thorium. Of various methods for effecting the recovery tried and used prior to the present invention, those involving the preferential extraction of uranium with organic solvents from aqueous thorium-uranium solutions have appeared to afford the most satisfactory results. Even so, however, the uranium extraction efficiencies of the most promising solvents, when employed under conditions which would avoid the concomitant extraction of prohibitive amounts of thorium, were found to be relatively low; generally about a half dozen consecutive batch extractions were required to achieve reasonably complete recovery of the desired uranium. While in some cases minor improvement was afforded by employing salting out agents, such as aluminum nitrate and calcium nitrate, the salting agents often deleteriously also increased the amount of thorium extracted and generally undesirably interfered with subsequent thorium recovery.

Thus, previously existing processes for effecting the subject separation have left much to be desired, and consequently improved recovery methods have been sought for. The present invention provides such an improved recovery method.

One object of the present invention is to provide a new and improved process for the selective recovery of uranium.

Another object is to provide such a process for the separation and selective recovery of uranium values from admixture with thorium, especially small amounts of uranium from much larger masses of thorium.

Still another object is to provide such a method which affords single stage separation and recovery efficiencies superior to methods heretofore conventional.

A further object is to provide such a process for the separation and selective recovery of uranium values from admixture with protactinium.

Still a further object is to provide a means for improving existing organic solvent extraction procedures for separate recovery of uranium, especially from thorium, and from protactinium, if present, by simply incorporating an additional reagent in the process.

Yet another object is to provide an improved solvent for extracting uranium from aqueous solutions thereof.

Yet a further object is to provide an improved means for forming an organic complex selectively with uranium in systems containing both uranium and thorium ions, and/or uranium and protactinium ions.

Additional objects will become apparent hereinafter, as the description proceeds.

In accordance with the present invention, uranium is separately recovered from an aqueous solution containing uranyl and thorium ions by the process which comprises contacting the solution with an organic xanthate selected from the group consisting of alkali and alkaline earth xanthates which have the xanthate group attached to a secondary carbon atom, and recovering the resulting urano-xanthate complex by organic solvent extraction. Members of the specified class of xanthates, in particular those defined by the structural representation:

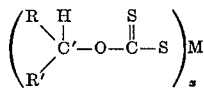

where R and R' are organic radicals selected from the group consisting of alkyl, aryl, and cycloalkyl radicals, and components of a mutually common single ring also having the denoted "C'" as a component, M is an alkali or alkaline earth metal atom, and $x$ is a number equal to the operative valence of the metal atom, M, have been found to be especially selective complexants for uranyl ions present in admixture with thorium ions. That is, these particular xanthates exhibit a great affinity for uranyl ions to form urano-xanthate complexes, but have been demonstrated to be substantially non-reactive in this way with thorium ions. These xanthates form uranium complexes which are, in general, markedly insoluble in aqueous solution, but quite soluble in organic solvents. As a result, upon effecting organic solvent extraction, the urano-xanthate complexes are effectively driven into the organic solvents with high extraction efficiency. The present process, when applied, for example, to a solution one molar in $Th^{+4}$ and $10^{-5}$ molar in $UO_2^{++}$, has been found capable in a single batch extraction, of effecting recovery of as high as ca. 95% of the uranium, while removing less than 0.5% of the thorium. Much of this small apparent thorium extraction is attributable to imperfect mechanical separation of the aqueus-organic phases, rather than to true thorium extraction. Being of such efficiency, the use of the present process advantageously requires fewer extraction stages than previous process, and eliminates the need for employing troublesome salting agents.

Aqueous solutions, containing uranyl and thorium ions, which may be effectively treated in accordance with the present invention are subject to wide variation. Naturally, solution conditions favorable to the existence of uranium and thorium in ionic form are beneficial; in this regard aqueous inorganic acid solutions have been found especially desirable. Nitric acid is preferred in that its oxidizing properties tend to maintain the dissolved uranium in the specified, oxidized uranyl state. It is particularly preferable, also, that the solution be maintained sufficiently acidic to prevent excessive adverse hydrolysis, and ensuant polymerization and precipitation of the uranium or thorium. As is known in the art, pH's below about 3.5 generally are sufficient to avoid such excessive hydrolysis in solutions having uranyl and thorium concentrations as great as 1 molar; at progressively lower concentrations, progressively higher pH's become satisfactory in this respect. Generally speaking, uranium may be effectively extracted from aqueous solutions of virtually any solute concentration by the present process. To attain maximum uranium extraction efficiency, though, the solution desirably should be as concentrated as practicable, for such efficiency has been noted to increase somewhat with increase in solution concentration. Apparently, both increased uranium concentration in the aqueous phase and the greater salting-out effect of increased thorium concentration serve to drive greater proportions of the complexed uranium into the organic phase. However, as the thorium concentration exceeds one molar, the amount of thorium simultaneously extracted commences to increase appreciably with the thorium concentration. It is therefore ordinarily advantageous, particularly when the concentration of uranium is much less than that of thorium, for the thorium concentration to be about one molar.

In instances where the desired uranium is originally contained in a solid medium, suitable solutions ordinarily may be prepared readily by conventional dissolution means. For instance, when the U-containing medium is a mass of thorium metal, or a thorium salt such as the hydroxide or carbonate, as normally obtain in the aforesaid U-isotope production operations, dissolution may be readily effected in moderately concentrated, say 12 N, nitric acid, then diluting and neutralizing with ammonium hydroxide to the preferred concentration and pH region; this procedure ordinarily results in substantially complete dissolution, as well as direct oxidation of the uranium content to the proper, uranyl oxidation state.

Having thus provided a suitable uranyl solution, the present process is applied thereto. A xanthate of the specified class is intimately contacted with the aqueous solution to effect the desired uranyl complexing. It has been discovered that among the xanthates generally, those as specified, which have the xanthate group attached to a secondary carbon atom are unusually efficacious for the present purpose. As set forth hereinabove, the carbon atoms attached to said secondary carbon atom may each be a component of an alkyl, aryl, or cycloalkyl group, or both may be components of the same single ring. Satisfactory xanthates having two alkyl groups attached to the secondary carbon atom include isopropyl-, sec-butyl-, α-ethylpropylxanthate, α-propyl-butyl-xanthate and α-propyl-isobutylxanthate. Satisfactory xanthates having an aryl group attached to the secondary carbon include α-phenyl-ethylxanthate, α-phenyl-propylxanthate, and α-benzyl-ethylxanthate. Those having a cycloalkyl group attached include α-cyclohexyl-ethylxanthate and dicyclohexyl methylxanthate. Finally, cyclohexyl xanthate is an example of a satisfactory xanthate wherein the secondary carbon attached to the xanthate group and the two carbons attached thereto are all components of a single ring. The metallic component of the xanthate group should be an alkali or alkaline earth metal; among the alkali metals, especially potassium and sodium are eminently suited for the purpose, with potassium being preferred. Broadly, the alkali and alkaline earth metal xanthates are soluble in both aqueous solutions and general organic solvents.

Regarding the amount of xanthate to be employed, it has been found that, in general, the more xanthate employed, the better. The stoichiometric molar ratio of xanthate to uranium to form the complex is evidently 2:1; therefore, it is desirable that at least this amount of xanthate be provided. However, xanthates generally exhibit an adverse tendency to decompose slowly in acidic aqueous solutions. Accordingly, for full effectiveness, it is advantageous to employ a substantial excess over this theoretical amount. In instances where uranium concentration is very low, such as in the discussed uranium isotope recovery processes, enormous xanthate excesses may be provided with reasonable actual xanthate concentrations. For example, in the cited $U^{233}$ operation, where an aqueous solution of say $10^{-5}$ molar in uranium would be treated, an amount of xanthate equivalent to as little as 0.01 molar would still adequately provide a 500 fold excess.

The resulting urano-xanthate complex is recovered from the aqueous solution by conventional organic solvent extraction procedures, involving intimately contacting the aqueous solution with a substantially water-immiscible organic solvent, permitting the organic and aqueous phases to stratify, and then withdrawing the stratified organic extract containing the recovered uranium. Generally speaking, among satisfactory conventional types of organic solvents, those found best adapted for extraction of the formed urano-xanthate complexes are the aliphatic ethers and ketones. Among the ethers, those having a plurality of ether linkages appear to afford superior results. It has also been empirically noted that for best results the ethers should preferably be straight-chained and have at their extremities at least four carbon atoms before the first ether linkage. For example, such polyethers as ethylene glycol dibutyl ether (dibutyl "Cellosolve") and diethylene glycol dibutyl ether (dibutyl "Carbitol") have been demonstrated to be excellent for the purpose. Typical of satisfactory mono-ethers are the dibutyl-, diamyl-, and dihexyl-ethers, and representative of aliphatic ketones which afford satisfactory extraction are methyl isobutyl ketone, heptanone-2, and diethyl ketone.

In conducting the complexing and extraction operations of the present process, the selected xanthate may be added directly to the aqueous solution and the solution subsequently subjected to the organic solvent extraction procedure. However, it is to much advantage that the xanthate be introduced simultaneously with the organic solvent. This is advisable, in view of the general water-insolubility of the formed urano-xanthate complexes, in order to avoid deleterious precipitation of the complexes before extraction is effected. A convenient and effective procedure for the simultaneous introduction is to dissolve the xanthate in the organic solvent prior to introduction, and then intimately contact the aqueous solution with the resulting organic xanthate solution. Thus, the organic solvent-xanthate solution is, in effect, an improved solvent for uranium extraction. A simple batch extraction procedure for conducting the operations in this manner comprises adding to a volume of the aqueous solution an equal volume of organic solvent-xanthate solution, thoroughly admixing and agitating the system, say by shaking, and then, after the phases have stratified upon standing, separating the phases by either syphoning off the organic phase, or draining away the aqueous solution. The volume of solvent employed may often advantageously be considerably smaller than the volume of aqueous solution, particularly where the uranium concentration is very low. In this way the volume of solution associated with the extracted uranium may be reduced, thus concentrating the uranium.

While the mentioned xanthate decomposition normally does not proceed at a prohibitive rate, it has a general detractive effect upon uranium extraction efficiency, progressively increasing with contact time. Accordingly, for maximum process effectiveness, it is advantageous to mitigate such decomposition as far as practicable. In the decomposition, the xanthates appear to be hydrolyzed to the corresponding xanthic acids, which in turn decompose; accordingly, the rate of decomposition increases with decrease in pH of the aqueous solution. However, while increasing the pH of the aqueous solution therefore beneficially decreases the xanthate decomposition rate, it also disadvantageously increases the rate of hydrolysis of thorium and uranium solutes. Upon balancing these two conflicting effects, for solutions not over 1 M in Th or U, an optimum pH range of about 3.0 to 3.5 has been found to afford the slowest xanthate decomposition rate at a still permissible solute hydrolysis rate. Fortunately, in the present process, uranium complex formation and its extraction are very rapid; with uranium solutions as concentrated as 0.001 M, contact of only about two minutes with an organic solvent-xanthate solution has proven to be of adequate duration for substantial completion of the complexing and extraction. Contact time may advantageously be curtailed accordingly, thereby limiting the extent of adverse decomposition which may obtain during the contact period. If it is desired to employ extractions of much longer duration, the xanthate decomposition may be effectively counteracted by adding additional fresh xanthate complexant to the system during the period of agitation.

In any case, through, xanthate decomposition is considerably slower when the xanthate is initially dissolved in the organic solvent, rather than the aqueous solution. It has further been noted that the stability of the xanthate appears to vary with the identity of the particular xanthate. For example, when in the same organic solvent (diethylene glycol dibutyl ether), cyclohexyl xanthate has been noted to decompose, during contact with an aqueous solution of pH 3, only about ¾ as rapidly as does isopropyl xanthate. Also, xanthate stability apparently varies with the particular organic solvents used. For example, isopropyl xanthate, when in diethylene glycol dibutyl ether, decomposes only about 70% as rapidly, during contact with an aqueous solution of pH 3, as when in ethylene glycol dibutyl ether. Thus, the resulting stability of the xanthate is generally a criterion in the selection of both the xanthate and the solvent with which it is employed.

Upon completion of complexing and extraction operations of the present process, the extracted uranium may then be stripped from the separated organic phase by scrubbing with a fairly concentrated aqueous mineral acid which dissolves the uranyl ion, for example, one-normal nitric acid. Upon intimately contacting the stripping solution with the organic phase, the acid promotes rapid xanthate decomposition in the organic phase, and then strips the liberated uranyl ions from the organic solvent. If it is desired to further decontaminate the extracted and stripped uranium of the small proportion of thorium that has accompanied it into the acid stripping solution, the present process may be applied to the stripping solution to again recover almost all of the uranium while extracting only a small proportion of the thorium present. The extracted uranium may be thus treated by a sufficient number of repetitions of the present process to attain the desired purity with respect to thorium.

Likewise, if uranium recovery from the original aqueous solution greater than is effected by a single application of the described complexing-extraction operation is desired, a plurality of the operations may be applied thereto in succession, in the manner customary in multiple batch extractions. Furthermore, while this process has been described with particular reference to batch extraction techniques, it is also adaptable to conventional continuous column extraction procedures. In such procedures continuously flowing streams of the organic solvent and the aqueous solution are intimately contacted and then separately withdrawn; the xanthate complexant may be incorporated in either the aqueous or organic influent streams, again preferably in the organic.

It is thought that the mechanism of urano-xanthate complex formation is principally one of an organic salt metathesis, with the alkali metal atom of the xanthate being replaced by the uranyl radical. The complexes could therefore be considered to be uranyl xanthate salts, with two xanthate groups being joined to each uranyl radical. However, it is not intended that this invention be limited to any particular theory concerning the nature of the complex formed; in view of the uncertainty regarding the complete mechanism of uranium-xanthate bonding, the more general term "complexing" has been adhered to herein.

Further illustration of the quantitative aspects and preferred reagents and procedure of the present process is provided in the following specific examples. Example I demonstrates the efficacy of the process for separating minute concentrations of uranium from macroscopic bulks of thorium, under conditions and in relative amounts normally encountered in the U-isotope production operations referred to hereinbefore. The relative uranium extraction effectiveness of each of several representative xanthates and solvents are compared both with each other, and with the effectiveness of the same solvents without any xanthate complexant. The proportion of the thorium accompanying the uranium into the extract in the various instances is also recorded.

thorium extraction was substantially independent of xanthate complexants used, but was somewhat dependent upon the particular solvent employed. Therefore, the single average percentage of thorium extracted by each solvent, which did not vary considerably with different xanthate complexants or with no xanthate present at all, is tabulated in the last row of the table.

*Table I*

| Xanthate | | | Percent uranium extracted | | | | |
| --- | --- | --- | --- | --- | --- | --- | --- |
| Identity | Molecular weight | Grams added per liter solution | Diethylene glycol dibutyl ether | Ethylene glycol dibutyl ether | Di-n-butyl ether | Methyl isobutyl ketone | Heptanone-2 |
| None | | | 28.2 | 2.5 | 0.6 | 28.2 | 32.5 |
| Potassium isopropyl xanthate | 174 | 48.4 | 82.8 | 93.4 | 88.8 | 75.3 | 79.3 |
| Potassium cyclohexyl xanthate | 213 | 59.2 | 89.3 | 21.8 | 79.3 | 82.5 | 62.4 |
| | | | Percent thorium extracted | | | | |
| | | | 0.4 | 0.37 | 0.4 | 0.55 | 0.48 |

EXAMPLE I

A large volume of an aqueous nitric acid thorium-uranium stock solution was analyzed to be 1.0 molar in thorium as $Th^{+4}$ and $2.78 \times 10^{-5}$ molar in uranium as $UO_2^{++}$ comprising $U^{233}$ tracer, and to have a pH of 3. Equal volumes of the stock solution were subjected to comparative extractions employing the following procedure in each case. The portion of stock solution was introduced into a separatory funnel; an equal volume of organic solvent and the indicated amount of xanthate complexant were then added simultaneously to the funnel. In some cases the xanthate was previously dissolved in the solvent, while in others, the xanthate, in crystalline form, was weighed and introduced on top of the solvent layer in the separatory funnel. The results obtained were independent of the particular xanthate introduction technique used. The funnel was stoppered and shaken on a mechanical shaker for a period of five minutes, then allowed to stand for a period of two minutes to permit stratification of the organic and aqueous phases. The organic layer was then separated, and analyzed for its uranium and thorium content. Precise uranium analysis at the low concentrations encountered was effected by means of a determination of the $U^{233}$ radioactivity. The results are tabulated in Table I below. The uranium and thorium contents are given as percentages of the total content in the original portion of aqueous solution. In the first series of runs, no xanthate was employed. In the second series, xanthate was employed in each case in an amount equivalent to 0.278 molar (10,000 times the molar concentration of uranium). It was found that The efficacy of the present process and the improvement it affords over the use of the plain organic solvents is evidenced by the results set forth in Table I. The substantial non-reactivity of the xanthate with thorium is also evidenced; the concentration of xanthate employed was more than quarter molar, a concentration adequate to have demonstrated any effect of the xanthate in increasing the proportion of the one-molar thorium extracted, if it occurred, but no such action appeared. It may be further observed that with different xanthates, different solvents give better results than others. Therefore, superior over-all extraction efficiency is obtainable by judicious coupling of particular xanthate and solvent species. For example, it may be noted that Table I indicates that ethylene glycol dibutyl ether is the best of the listed solvents for use with potassium isopropyl xanthate, while diethylene glycol dibutyl ether is the best of those for use with potassium cyclohexyl xanthate. Low uranium recovery with the cyclohexyl xanthate in ethylene glycol dibutyl ether solvent may be noted in Table I; in this case the cyclohexyl xanthate appeared to decompose quite rapidly, resulting in the rather poor extraction. However, uranium recovery in this case may be considerably improved by employing a shorter shaking time, and adding fresh xanthate during the extraction.

In Example II, the effect of varying the time of contact of the solvent and xanthate with the aqueous solution is illustrated.

EXAMPLE II

The entire procedure of Example I was duplicated in every way, except that a shaking time of ten minutes rather than five minutes was employed, and the funnels were then allowed to stand five minutes rather than two minutes. The results obtained are tabulated in Table II below.

*Table II*

| Xanthate | | | Percent uranium extracted | | | | |
| --- | --- | --- | --- | --- | --- | --- | --- |
| Identity | Molecular weight | Grams added per liter solution | Diethylene glycol dibutyl ether | Ethylene glycol dibutyl ether | Di-n-butyl ether | Methyl isobutyl ketone | Heptanone-2 |
| Potassium isopropyl xanthate | 174 | 48.4 | 74.5 | 82.0 | 78.0 | 34.6 | 70.5 |
| Potassium cyclohexyl xanthate | 213 | 59.2 | 83.2 | 15.1 | 61.3 | 64.0 | 62.3 |

By comparing the results presented in Table II with those in Table I the small but appreciable decrease in the percentage of uranium extracted as the contact time is lengthened may be perceived. This decrease in effectiveness is attributable to the increased decomposition of the xanthate during the lengthened contact time. Further tests have indicated that, in general, the optimum shaking time for maximum uranium extraction is between about two and four minutes.

The effect of varying the concentration of the xanthate is illustrated by Example III.

EXAMPLE III

The same procedure as employed in Example I was employed, with the exception that only one-tenth as much xanthate complexant was utilized. The shaking time was five minutes, and the standing time two minutes. The results are presented in Table III below.

*Table III*

| Xanthates | | | Percent uranium extracted—methyl isobutyl ketone |
|---|---|---|---|
| Identity | Molecular weight | Grams added per liter solution | |
| Potassium isopropyl xanthate | 174 | 4.84 | 73.2 |
| Potassium cyclohexyl xanthate | 213 | 5.92 | 78.0 |

By comparison of Table III with Table I, it may be seen that the percentage of uranium extracted decreased only slightly with the ten-fold decrease in xanthate concentration. Thus, when treating the $10^{-5}$ M uranium solutions encountered in the mentioned uranium isotope production procedures, xanthate concentrations as low as $10^{-2}$ M still provide much more than enough xanthate for efficient extraction of seven minutes duration.

While this invention has been described with particular reference to its application to the recovery of uranium present in very small amounts in solutions containing large amounts of thorium, it is inherently of much wider applicability. The process is also well adapted to affording improved uranium extraction from solutions wherein the disparity between the uranium and thorium concentrations is not so great, for example in processes for the recovery of uranium from certain thorium-uranium ores. In fact, the present process may be beneficially applied to thorium-uranium solutions of any relative proportion; with solutions containing uranium in high concentrations, the incorporation of xanthate enhances the extraction of the bulk of the uranium, and of course, is especially valuable in effecting subsequent extraction of whatever small amounts of uranium remain in the aqueous phase after the first bulk extraction.

More generally, however, the present invention has various other important aspects besides its application to the selective extraction of uranium from thorium. This invention provides a particular group of complexants which are especially selective for uranium, but substantially non-reactive with thorium. These complexants may be employed in various diverse uranium processes, not necessarily solvent extraction, where selective complexing of uranium in a uranium-thorium system is desired. Furthermore, the improved uranium complexing and extraction operations of this invention may be beneficially applied, in an identical manner and with like efficacy, to improved recovery of uranium values from aqueous solution, where no thorium whatever is involved or introduced. Such process may well be applied, for example, to concentration of uranium from aqueous process solutions, to stripping valuable uranium from waste solutions, and to recovery of radioactive uranium tracers after use.

Along these lines, it has also been discovered that when the aqueous uranium solutions subjected to the present process also contain protactinium values, that the Pa remains in predominantly the aqueous phase throughout the operation. Only a very small percentage (less than 0.1% in all cases) is extracted into the organic phase, either with or without xanthate being present. Therefore, if so desired in the described uranium isotope production operations, the uranium may be recovered from solution before the protactinium has substantially completely decayed. Thus, a solution of irradiated thorium, say, could be beneficially subjected to the present process at several different times, allowing a sufficient period between each extraction to permit a suitable fresh amount of uranium to form by radioactive decay. Accordingly, being that protactinium is thus not extracted, the applicability of the present process is considerably extended; this process is generally applicable to improved separation of uranium from protactinium, regardless of whether or not thorium is also present in the system.

This invention also provides an improved organic solvent for extracting uranium from aqueous solution comprising an organic solvent solution of a member of the specified class of xanthates; since such an improved uranium solvent may be employed in place of previously-conventional organic solvents, it has many beneficial applications in the general processing of uranium. In addition, this invention provides a means for improving existing conventional organic solvent uranium extraction procedures which necessitates virtually no essential change in the equipment or operating procedure employed, comprising the one simple step of incorporating one of the specified xanthates in the system during the extraction procedure. Various additional applications of the hereinbefore-disclosed process will become apparent to those skilled in the art.

For further information regarding this type of process, reference is made to applicant's co-pending applications: Serial No. 154,450, filed April 6, 1950, for "Recovery of Uranium by Aryl Dithiocarbamate Complexing," and Serial No. 154,451, filed April 6, 1950, for "Recovery of Uranium by Cycloalkyldithiocarbamate Complexing."

It is therefore to be understood that all matters contained in the above description and examples are illustrative only and do not limit the scope of the present invention.

What is claimed is:

1. A selective complexing-organic solvent extraction process for the separation and selective recovery of uranium values from an aqueous solution containing the same in the form of uranyl ions, together with at least one member selected from the group consisting of thorium ions and protactinium ions, which comprises contacting said solution with an organic xanthate chosen from the group consisting of alkali and alkaline earth xanthates having a xanthate group attached to a secondary carbon atom, and extracting resulting urano-xanthate complex with an organic solvent.

2. A selective complexing-organic solvent extraction process for the separation and selective recovery of uranium values from an aqueous solution containing the same in the form of uranyl ions, together with dissolved thorium values, which comprises contacting said solution with an organic xanthate chosen from the group consisting of alkali and alkaline earth xanthates having a xanthate group attached to a secondary carbon atom, extracting resulting urano-xanthate complex with an organic solvent, and separating the resulting uranium-containing organic solvent phase from the thorium-containing aqueous phase.

3. A selective complexing-organic solvent extraction process for the separation and selective recovery of uranium values from an acidic aqueous solution containing the same in the form of uranyl ions, together with dissolved thorium values, which comprises contacting said solution with an organic xanthate of structural representation:

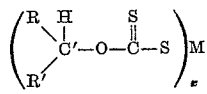

where R and R' are organic radicals selected from the group consisting of alkyl, aryl, and cycloalkyl radicals, and components of a mutually common single ring also having the denoted "C'" as a component, M is an atom selected from the group consisting of alkali and alkaline earth metals, and $x$ is a member equal to the operative valence of the metal atom, M, extracting resulting urano-xanthate complex with an organic solvent chosen from the group consisting of aliphatic ethers and aliphatic ketones, and separating the resulting uranium-containing organic solvent phase from the thorium-containing aqueous phase.

4. A selective complexing-organic solvent extraction process for the separation and selective recovery of uranium values from an aqueous nitric acid solution containing the same in the form of uranyl ions, together with dissolved thorium values, which comprises contacting said solution with an alkali organic xanthate having a xanthate group attached to a secondary carbon atom having separately attached thereto two alkyl radicals, extracting resulting urano-xanthate complex with an organic solvent, and separating the resulting uranium-containing organic solvent phase from the thorium-containing aqueous phase.

5. A selective complexing-organic solvent extraction process for the separation and selective recovery of uranium values from an aqueous nitric acid solution containing the same in the form of uranyl ions, together with dissolved thorium values, which comprises contacting said solution with an alkali organic xanthate having a xanthate group attached to a secondary carbon atom having attached thereto an aryl radical, extracting resulting urano-xanthate complex with an organic solvent, and separating the resulting uranium-containing organic solvent phase from the thorium-containing aqueous phase.

6. A selective complexing-organic solvent extraction process for the separation and selective recovery of uranium values from an aqueous nitric acid solution containing the same in the form of uranyl ions, together with dissolved thorium values, which comprises contacting said solution with an alkali organic xanthate having a xanthate group attached to a secondary carbon atom having attached thereto a cycloalkyl radical, extracting resulting urano-xanthate complex with an organic solvent, and separating the resulting uranium-containing organic solvent phase from the thorium-containing aqueous phase.

7. A selective complexing-organic solvent extraction process for the separation and selective recovery of uranium values from an aqueous nitric acid solution of pH substantially within the range of 3.0 to 3.5 containing the same in the form of uranyl ions, together with dissolved thorium values, which comprises contacting said solution with potassium isopropyl xanthate in amount in substantial excess over twice the molar concentration of uranyl ions, extracting resulting urano-xanthate complex with an aliphatic ether having at the extremities of its molecule at least four carbon atoms before the first ether linkage, and separating the resulting uranium-containing ether phase from the thorium-containing aqueous phase.

8. A selective complexing-organic solvent extraction process for the separation and selective recovery of uranium values from an aqueous nitric acid solution of pH substantially within the range of 3.0 to 3.5 containing the same in the form of uranyl ions, together with dissolved thorium values, which comprises contacting said solution with potassium cyclohexyl xanthate in amount in substantial excess over twice the molar concentration of uranyl ions, extracting resulting urano-xanthate complex with an aliphatic ether having at the extremities of its molecule at least four carbon atoms before the first ether linkage, and separating the resulting uranium-containing ether phase from the thorium-containing aqueous phase.

9. A selective complexing-organic solvent extraction process for the separation and selective recovery of a microscopic concentration of uranium values from an aqueous nitric acid solution of pH of substantially 3 containing the same in the form of uranyl ions, together with a substantially one molar microscopic concentration of dissolved thorium values, which comprises contacting said solution with potassium isopropyl xanthate in an amount in a molar excess of the order of 1,000 to 10,000 times that of the uranyl ion concentration, extracting resulting urano-xanthate complex with a volume, substantially equal to that of said aqueous solution, of ethylene glycol dibutyl ether, and separating the resulting uranium-containing ether phase from the thorium-containing aqueous phase.

10. A selective complexing-organic extraction process for the separation and selective recovery of uranium values from an acidic aqueous solution containing the same in the form of uranyl ions, together with dissolved protactinium values, which comprises contacting said solution with an organic xanthate chosen from the group consisting of alkali and alkaline earth xanthates having a xanthate group attached to a secondary carbon atom, extracting resulting urano-xanthate complex with an organic solvent, and separating the resulting uranium-containing organic solvent phase from the protactinium-containing aqueous phase.

11. In a process for the separation and recovery of uranium values from an aqueous solution containing the same in the form of uranyl ions, together with at least one member selected from the group consisting of thorium ions and protactinium ions, comprising the organic solvent extraction of uranyl values from said solution, the improvement which comprises including in the organic solvent-aqueous solution system obtaining during said extraction operation an organic xanthate chosen from the group consisting of alkali and alkaline earth xanthates having a xanthate group attached to a secondary carbon atom, thereby enhancing the uranium extraction efficiency of the process.

12. In a process for the separation and recovery of uranium values from an aqueous solution containing the same in the form of uranyl ions, together with at least one member selected from the group consisting of thorium ions and protactinium ions, comprising the extraction of uranyl values from said solution with an organic solvent, the application of the improved solvent for accomplishing said extraction which comprises an organic solvent solution of an organic xanthate chosen from the group consisting of alkali and alkaline earth xanthates having a xanthate group attached to a secondary carbon atom.

13. A method for forming an organic-solvent-soluble organic complex selectively with uranyl ions, which are contained in an aqueous solution together with thorium ions, which comprises incorporating into said solution an organic xanthate chosen from the group consisting of alkali and alkaline earth xanthates having a xanthate group attached to a secondary carbon atom.

References Cited in the file of this patent

Malatesta: "Gayz. Chim. Ital.," 69, 408–16 (1939).
Hackh's Chemical Dictionary, 3rd ed., page 914 (1944), The Blakiston Co., Philadelphia, Pa.
Kahler et al.: "BMI–JDS–127," page 14 especially, June 30, 1948.

UNITED STATES PATENT OFFICE

CERTIFICATE OF CORRECTION

Patent No. 2,902,503            September 1, 1959

Orear Kenton Neville

It is hereby certified that error appears in the printed specification of the above numbered patent requiring correction and that the said Letters Patent should read as corrected below.

Column 12, line 13, for "microscopic" read -- macroscopic --; line 23, after "organic" insert -- solvent --.

Signed and sealed this 5th day of April 1960.

(SEAL)
Attest:

KARL H. AXLINE
Attesting Officer

ROBERT C. WATSON
Commissioner of Patents